United States Patent
Lee (10) Patent No.: US 12,242,463 B1
(45) Date of Patent: Mar. 4, 2025

(54) TRANSACTIONAL DATABASE SYSTEM IMPLEMENTED USING STRONGLY CONSISTENT OBJECT STORAGE

(71) Applicant: Rapid7, Inc., Boston, MA (US)

(72) Inventor: Austin Lee, Burbank, CA (US)

(73) Assignee: Rapid7, Inc., Boston, MA (US)

( * ) Notice: Subject to any disclaimer, the term of this patent is extended or adjusted under 35 U.S.C. 154(b) by 40 days.

(21) Appl. No.: 18/085,745

(22) Filed: Dec. 21, 2022

(51) Int. Cl.
*G06F 16/23* (2019.01)
*G06F 16/22* (2019.01)

(52) U.S. Cl.
CPC ...... *G06F 16/2379* (2019.01); *G06F 16/2246* (2019.01)

(58) Field of Classification Search
CPC .......................... G06F 16/2379; G06F 16/2246
See application file for complete search history.

(56) References Cited

U.S. PATENT DOCUMENTS

| | | | |
|---|---|---|---|
| 8,402,061 B1 | 3/2013 | Briggs et al. | |
| 9,430,390 B2 | 8/2016 | Mukherjee et al. | |
| 10,002,175 B2 | 6/2018 | Kemper et al. | |
| 10,019,284 B2 | 7/2018 | Promhouse et al. | |
| 11,068,501 B2 | 7/2021 | Gupta et al. | |
| 11,138,180 B2 | 10/2021 | Chang et al. | |
| 11,537,311 B1 * | 12/2022 | Dhupelia | G06F 3/0619 |
| 11,720,563 B1 * | 8/2023 | Khan | H04L 67/568 |
| | | | 707/718 |
| 2014/0172889 A1 * | 6/2014 | Adam | G06F 16/2474 |
| | | | 707/756 |
| 2017/0193012 A1 * | 7/2017 | Gupta | G06F 16/2329 |
| 2017/0300552 A1 * | 10/2017 | Mandadi | G06F 16/9024 |
| 2019/0050831 A1 | 2/2019 | Kikinis | |
| 2019/0361895 A1 | 11/2019 | Weaver et al. | |
| 2021/0342331 A1 * | 11/2021 | Saba | G06F 16/14 |
| 2023/0205758 A1 * | 6/2023 | Gordon | G06F 16/2379 |
| | | | 707/703 |
| 2023/0401197 A1 * | 12/2023 | Paulus | G06F 16/2358 |

FOREIGN PATENT DOCUMENTS

WO 2011116324 B1 9/2011

* cited by examiner

*Primary Examiner* — Huawen A Peng
(74) *Attorney, Agent, or Firm* — Ashwin Anand; Lei Sun (57) ABSTRACT

Embodiments of a transactional database system are described to implement transaction processing over database objects stored in a strongly consistent object storage system. When a transaction is initiated, the system makes a private copy of data objects that are used by the transaction. Reads and writes of the transaction will be performed on the private copy. When the transaction is to be committed, the system verifies that the committed state of the data objects has not changed outside the transaction, and updates metadata object(s) in the data storage system to point to the private copy as the currently committed state of the data objects. If the committed state of any data objects has changed during the transaction, the private copy is abandoned and the transaction is rolled back and/or retried.

20 Claims, 8 Drawing Sheets

```
metadata file 430

{ Committed Version: A230FF44.dat,                          510
  Commit Time: 2022-12-25 10:39:20,
  New Transactions: [
      { Transaction Copy: A230FF47.dat,                     512
        Start Time: 2022-12-25 12:21:30,
        Writer: item-update.sql (alee),
        Result: Committed
      },
      { Transaction Copy: A230FF50.dat,                     514
        Start Time: 2022-12-25 12:21:35,
        Writer ID: item-data-refresh (admim),
        Result: Conflict Rollback
      }]
}
{ Committed Version: A230FF47.dat,                          520
  Commit Time: 2022-12-25 12:21:40,
  New Transactions: [
      { Transaction Copy: A230FF55.dat,
        Start Time: 2022-12-25 12:21:50,
        Writer ID: item-data-refresh (admim),
        Result: Committed
      }]
}
{ Committed Version: A230FF55.dat,                          530
  Commit Time: 2022-12-25 12:22:02,
  New Transactions: []
}
```

TRANSACTIONAL DATABASE SYSTEM IMPLEMENTED USING STRONGLY CONSISTENT OBJECT STORAGE

BACKGROUND

Vast amounts of data are housed in distributed data storage systems such as distributed file systems or cloud-based object storage systems. Many of these storage systems offer a strongly consistent writes, where a write acknowledged by the system is immediately observable across the entire distributed system, so that all readers after the acknowledged write are guaranteed to see the write. This is in contrast with an eventual consistency semantic where acknowledged writes are not guaranteed to be immediately observable by readers. The strongly consistent model is preferable to users for a host of reasons, including write predictability and performance. As one example, the S3 service offered by AMAZON WEB SERVICES (AWS) is a strongly consistent data storage service.

While many data storage systems now implement strongly consistent writes, they do not generally implement transactional access of the data. For example, current distributed storage systems such as S3 do provide a data access API that allows multiple data objects to be accessed as atomic unit, or a group of data objects to be updated in an all-or-nothing operation. Users who wish to access the data in a "transactional" manner must implement their own solutions such as external locking protocols, which can require specialized knowledge about the particular data storage system and/or distributed programing techniques. Moreover, client-developed transactional solutions cannot be generally ported from one data storage system to a different data storage system. The lack of transactional support in current distributed data storage systems makes these systems difficult to use for sophisticated data applications.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Generally described, the present disclosure relates to embodiments of a transactional database system that implements transactions over data objects stored in a strongly consistent object storage system. In some embodiments, the database system may present the data as tables (e.g. tables accessible via Structured Query Language or SQL), and the data objects stored in the object storage system may be data files that correspond different portions of the tables (e.g. rows or columns of the tables). In some embodiments, the object storage system may organize the data objects in a hierarchical structure (e.g. a file directory structure). In some embodiments, the object storage system is a third-party system that is managed and executed independently from the transactional database system.

In some embodiments, when a transaction is initiated, the transactional database system makes a private copy of data objects that are used by the transaction in the object storage system. Reads and writes of the transaction will be performed on the private copy. When the transaction is to be committed, the transactional database system checks whether the committed state of the data objects has changed outside the transaction since the transaction began. If not, the database system updates metadata object(s) associated with the data objects to refer to the private copy as the currently committed state of the data objects. On the other hand, if the committed state of any data objects has changed during the transaction (e.g. modified by an intervening writer), the private copy is abandoned and the transaction is rolled back and/or retried.

Advantageously, by making a copy of data used by the transaction, the transactional database system reduces use of mutually exclusive locks on the data objects. For some types of object storage systems, such locking is not possible through their APIs. The described transactional database system only requires a small number of operations of the underlying data storage system (e.g. API calls to copy and update data objects), so that the transactional database system can be easily ported across different types of data storage systems. Additionally, in some embodiments, the described transactional model is implemented within the hierarchical storage structure of the data objects, so that the database system is able to enforce transactional isolation at any level of the database schema (e.g. one or more tables, one or more table rows, or one or more table columns). The transactional database system can be adapted for a wide variety of data storage models or database schemas.

As will be appreciated by those skilled in the art, the features of the disclosed transactional database system are designed to solve technical problems rooted in the computer field, and are not intended to capture any human mental and pen-and-paper processes, basic methods of organizing human activity, pure mathematical processes and formulas, and/or conventional business practices. These features and advantages of the transactional database system are described in further detail below, in connection with the figures.

Figure 1:
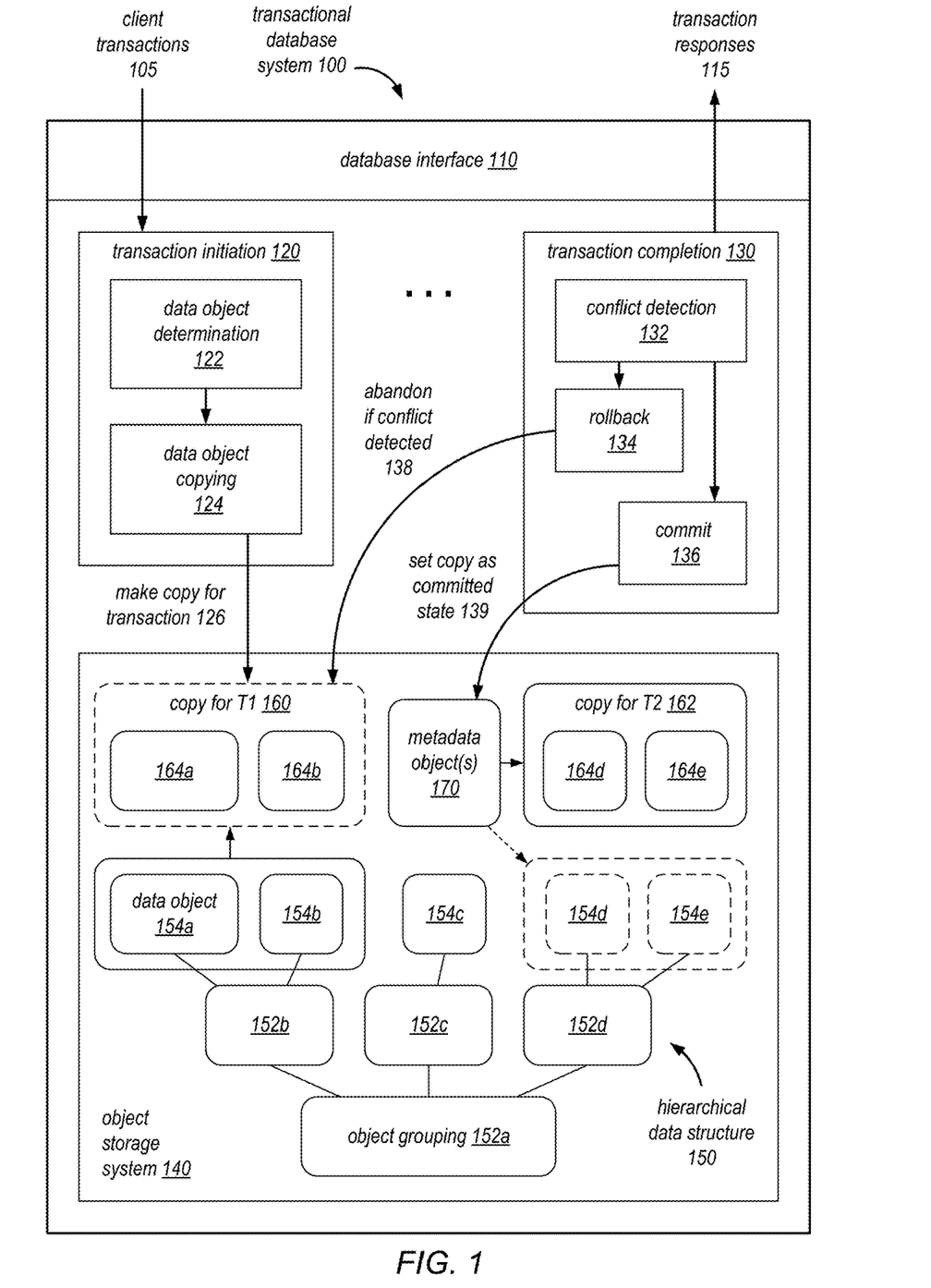
FIG. 1 illustrates an embodiment of a transactional database system that implements data transactions over an object storage system, according to some embodiments.

FIG. 1 illustrates an embodiment of a transactional database system that implements data transactions over an object storage system, according to some embodiments.

As shown, the figure depicts a transactional database system 100. The transactional database system 100 may be implemented on one or more computer systems to store and manage data for database clients. The transactional database system 100 implements a database interface 110 that allows clients to read and write data stored in the database system. In some embodiments, the database interface 110 may also be used by users to perform various administrative tasks, such as to change the data schema of a database or configure a data management process such as data backup or replication. In some embodiments, the database system 100 is a multi-tenant system that manages database instances on behalf of many different clients. In some embodiments, the database system 110 is a SQL database system that presents data in tables and allows users to query and update table data using SQL.

As shown, the database interface 110 of the database system may be used to receive client transactions 105. A transaction may be received as an ad hoc client request, or in some embodiments, stored as a database object within the database and invoked on demand. A particular transaction may specify a series of data read and write operations on data items in the database, to be performed together as an atomic operation. For example, the updates in the transaction will be performed in an all-or-nothing fashion. Also, all operations of the transaction should occur at a single logical point in time, so that data used by the transaction does not change during the execution of the transaction. When a transaction completes successfully, all of its updates should be committed so that the changes are made visible to all clients of the database. At any time before the transaction commits, the transaction may be rolled back so that all updates performed by the transaction are discarded.

As shown, to execute a transaction, the database system 100 implements a transaction initiation step 120 and a transaction completion step 130. During the transaction initiation step 120, a data object determination operation 122 is performed to determine what data objects 154 in an underlying object storage system 140 will be accessed (e.g. read or written) by the transaction. The data objects that will be accessed by the transaction may be referred to as the scope of the transaction. The transaction scope may be determined by the database system based on the code of the transaction. In some embodiments, the client may explicitly specify the scope of a transaction in a "prepare transaction" request.

In some embodiments, the database system may allow clients to specify the granularity level for transaction scoping. For example, a user may specify that when a transaction reads or writes a data item, the transaction will be provided an isolated view (e.g. a private copy 160) of the entire table that contains the data item. As another example, a transaction may be provided a copy of just a single shard or partition of the table that contains the item. The isolation or granularity level of transactions may be defined via configuration settings. In some embodiments, the granularity level of transactions may be defined at the schema level (e.g. for a particular tenant, database, or table). In some embodiments, the level of transactions may be defined for individual transactions, or even individual data access operations within a transaction.

Once the transaction scope of the transaction is determined, a data object copying operation 124 is performed to make a private copy 126 of all data objects in the transaction scope, in the object storage system 140. For example, as shown, a copy 160 of data objects 154a and 154b is made for transaction T1. In this example, the copy 160 includes data objects 164a and 164b, which are initially copies of data objects 154a and 154b. As another example, a copy 162 may be made as part of the initiation of transaction T2, and includes data objects 164d and 164e, which are copies of existing data objects 154d and 154e. The copies 160 and 162 may be private to their respective transactions T1 and T2, so they can only be read and written by their respective transactions.

In some embodiments, the object storage system 140 may be a system that is separately managed and executed from the transaction database system 100. For example, the object storage system may be one or more file servers remote from the transactional database system 100, or a cloud-based object storage service provided by a multi-tenant infrastructure provider service such as AWS or AZURE. The object storage system 140 may provide a programmatic interface such as an API to receive defined requests from the database system 100, such as requests 126 to copy one or more data objects 154a and 154b.

As shown, in some embodiments, the data objects 154a-e in the object storage system 140 may be stored in a hierarchical data structure 150. The hierarchical data structure 150 may group data objects 154a-e in various object groupings 152a-d, possibly in a tree structure. In some embodiments, the hierarchical data structure 150 may be the directory tree structure of a file system, and each object grouping 152a-d may be a directory in the directory tree structure. The transactional database system 100 may organize data in a database in a layout scheme using the hierarchical structure. For example, in an embodiment, each client or tenant of the database system may be assigned a tenant directory. Under a tenant directory, each database (or schema) may have a separate database directory. Under a database directory, each table in the database may have a separate table directory. Under a table directory, each portion, shard, or partition of the table may have its own directory. In some embodiments, only the leaf level directory in the hierarchical data structure will store the actual data objects 165a-e, which may be stored specially formatted data files. Accordingly, each data object 154 in the hierarchical data structure 150 may be uniquely addressable in the object storage system by a file path such as [Tenant]/[Database]/[Table]/[Shard]/[File- Name]. In some embodiments, all private copies of a data object file are stored as individual files in the same directory as the data object file, using a file name that identifies the transaction.

As discussed, after a transaction is initiated 120, all reads and writes of the transaction are performed on its private copy 160 of the data. Once the transaction is ready to commit its changes, the transaction completion step 130 is performed. As shown, the completion step 130 will first perform a conflict detection operation 132 to see if the committed state of data objects within the transaction scope (e.g. data objects 154a and 154b for transaction T1) has changed outside the transaction while the transaction was executing. For example, such a change may occur if another transaction successfully committed a newer version of data object 154a or 154b during the pendency of transaction T1. Depending on the embodiment, the conflict detection 132 may be made based on the contents of one or more metadata objects 170 maintained in the object storage system 140 or the native file metadata of the data objects (e.g. the file update timestamps and/or filenames).

If a conflict is detected (e.g. the committed state of some data object within transaction scope has changed), the transaction will be rolled back via a rollback operation 134. The rollback operation 134 will abandon 138 the private copy 160 of the transaction so that the private copy cannot be included in the committed state of any of the data objects. In some embodiments, the rollback 134 may cause the associated private copy (e.g. copy 160) to be immediately deleted. In other embodiments, the abandoned copy may be marked for later deletion.

On the other hand, if a conflict is not detected (e.g. the committed state of all data objects in the transaction scope did not change), a commit operation 136 is performed. The commit operation 136 causes the private copy (e.g. copy 162) to be set 139 as the committed state for all data objects in the copy. In some embodiments, the setting 139 of the committed state of the data objects is performed by updating one or more metadata objects 170 in the object storage system 140. The metadata object 170 may act as a pointer that points to a particular version of the data object (e.g. a particular data object file) as the latest committed state of the data object. In this example, the metadata object(s) 170 is updated so switch the pointer from data objects 154d and 154e to data objects 164d and 164e. The change of the pointer effectively results in a change in the committed state of the database. For example, all database access routines in the database system may understand the pointed-to version of the data object as the currently committed state of the data object. In some embodiments, the metadata objects may be implemented as metadata files in the same directory as associated data object files. In other embodiments, the database system may employ one or more global metadata files that implement pointers for many data objects in the object storage system. In some embodiments, an obsolete version of a data object (e.g. versions 154d and 156e) may be deleted immediately after the transaction completes. In other embodiments, the obsolete versions may be kept for later deletion or archival processes.

Figure 2:
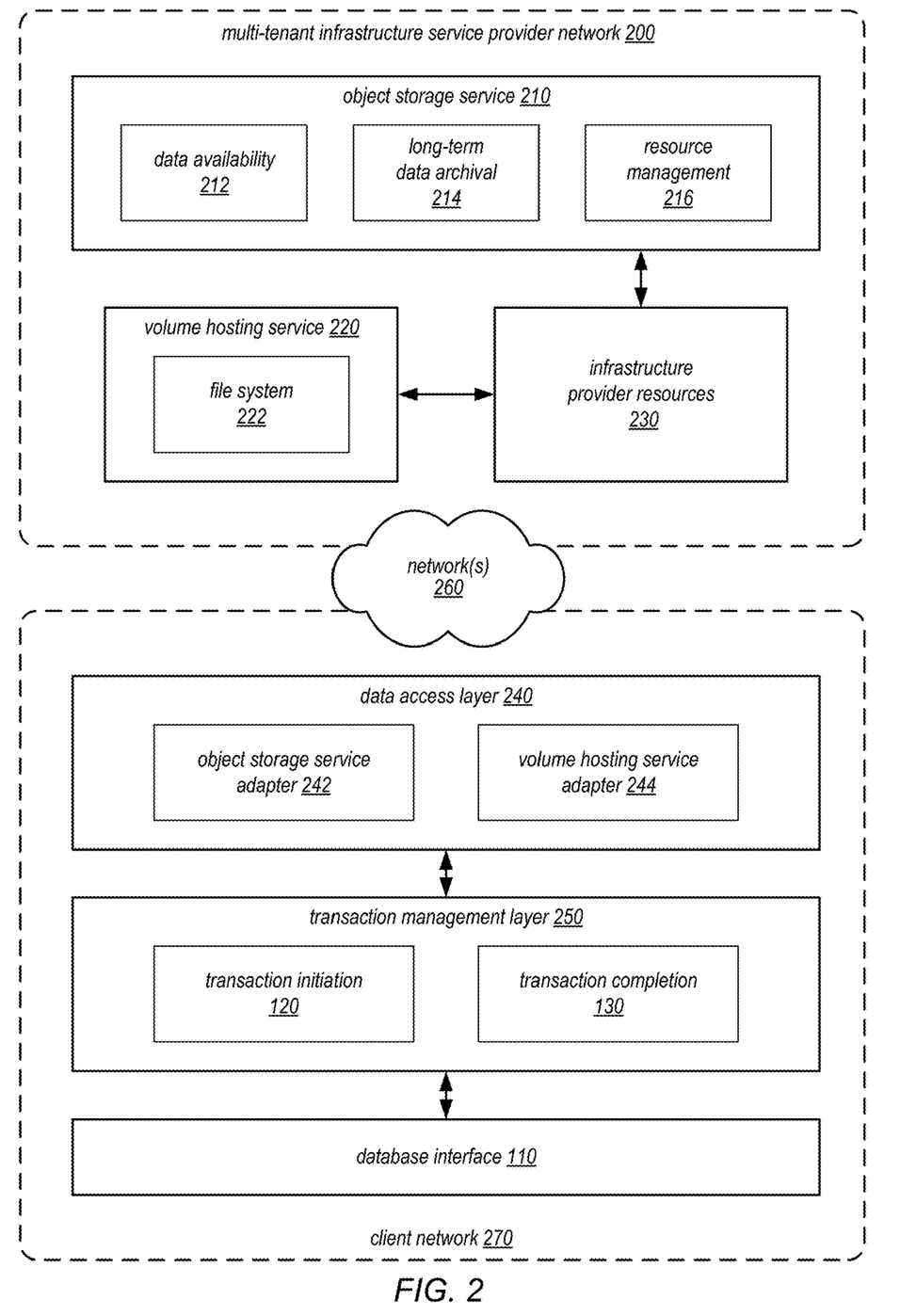
FIG. 2 illustrates an embodiment of the transactional database system that is implemented using data storage services provided by a multi-tenant infrastructure service provider network, according to some embodiments.

FIG. 2 illustrates an embodiment of the transactional database system that is implemented using data storage services provided by a multi-tenant infrastructure service provider network, according to some embodiments.

Multi-tenant infrastructure service provider network 200 may be a private or closed system or may be set up by an entity such as a company or a public sector organization to provide one or more computing infrastructure services (such as various types of cloud-based storage) accessible via the Internet and/or other networks to clients in their client networks 270, in some embodiments. Service provider network 200 may be implemented in a single location or may include numerous data centers hosting various resource pools, such as collections of physical and/or virtualized computer servers, storage devices, networking equipment and the like, needed to implement and distribute the infrastructure and services offered by the provider network 200. In some embodiments, provider network 200 may implement various computing infrastructure systems and/or resources 230 that are accessible via services, such as a virtual private cloud (VPC) service, one or more compute service(s), data storage service(s) 210 and 220, data analytic service(s), machine learning service(s), as well as other types of auxiliary services.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 8 and described below. In various embodiments, the functionality of a given system or service component may be implemented by a particular node or may be distributed across several nodes. In some embodiments, a given node may implement the functionality of more than one service system component (e.g., more than one data store component).

The compute service(s) implemented by service provider network 200 offer instances, containers, and/or functions according to various configurations for client operations. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A container may provide a virtual operating system or other operating environment for executing or implementing applications. A number of different types of computing devices may be used singly or in combination to implement the compute instances, containers, and/or functions of service provider network 200 in different embodiments, including general purpose or special purpose computer servers, storage devices, network devices and the like.

Compute instances, containers, and/or functions may operate or implement a variety of different services, such as application server instances, general purpose or special-purpose operating systems, services that support various interpreted or compiled programming languages such as Ruby, Perl, Python, C, C++ and the like, or high-performance computing services) suitable for performing client applications, without for example requiring the client(s) to access an instance. Applications (or other software operated/implemented by a compute instance and may be specified by client(s), such as custom and/or off-the-shelf software.

Compute instance configurations may also include compute instances, containers, and/or functions with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, containers, and/or functions, such as a particular number of virtual CPU cores, memory, cache, storage, as well as any other performance characteristic. Configurations of compute instances, containers, and/or functions may also include their location, in a particular data center, availability zone, geographic location, etc. and (in the case of reserved compute instances, containers, and/or functions) reservation term length.

As shown, the service provider network 200 may implement one or more network-based data storage service(s) 210 and 220. These types of data storage services may be used to implement the object storage system 140 of FIG. 1. For example, the object storage service 210 may provide storage for arbitrary data objects or files, which can be accessed via a key-value access interface. A hierarchy of stored data objects may be maintained using an appropriate naming convention of the objects. The object storage service 210 may be a strongly consistent data storage service where acknowledged writes are immediately and globally visible to all data readers. As shown, in some embodiments, object storage service 210 may implement a variety of data and resource management features such as data availability 212 (e.g. data mirroring and automatic disaster recovery), long-term data archival 214 (e.g. archival of successive committed states of data objects), and resource management (e.g. automatic scaling of storage and request handling resources). Another example of an object storage system 140 is the volume hosting service 220. This type of service 220 provides a block-based volume for clients, which may be used by clients to store a file system 222. The volumes may be attached or mounted to various compute nodes (e.g. virtual machine instances) over a network and accessed by the compute nodes as local disks. The volume hosting service 220 may implement a host of data and resource management features for hosted volume data, similar to the object storage service 210.

Generally speaking, the clients 270 of the service provider network 200 may encompass any type of client configurable to submit network-based requests to service provider network 200 via network(s) 260. For example, a given client device may include a suitable version of a web browser, or may include a plug-in module or other type of code module that may execute as an extension to or within an execution environment provided by a web browser. Alternatively, a client 270 may encompass an application (or user interface thereof), a media application, an office application or any other application that may make use of resources in in service provider network 200 to implement various features, systems, or applications. (e.g., to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, a client 270 may be an application that interacts directly with service provider network 200.

As shown in this example, the client 270 may comprise components of the transactional database system 100 of FIG. 1, including the database interface 110, a transaction management layer 250, and a data access layer 240. The data access layer 240 may include a variety of adapters that adapt or translate API calls form the transaction management layer 250 to API calls that are specific to the underlying object storage system. In this manner, the transactional database system 100 can be configured to operate over many different types of underlying object stores without significant changes to the transaction management layer 250. In this example, object storage service adapter 242 is used to connect to the object storage service 210, and volume hosting service adapter 244 is used to connect to the volume hosting service 220.

As shown, the clients 270 can convey network-based services requests to and receive responses from service provider network 200 via one or more networks 260. In various embodiments, network(s) 260 may encompass any suitable combination of networking hardware and protocols necessary to establish network-based-based communications between clients 270 and service provider network 200. For example, network 260 may generally encompass the various telecommunications networks and service providers that collectively implement the Internet. Network(s) 260 may also include private networks such as local area networks (LANs) or wide area networks (WANs) as well as public or private wireless networks. For example, a given client 270 and service provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 270 and the Internet as well as between the Internet and service provider network 200. It is noted that in some embodiments, clients 270 may communicate with service provider network 200 using a private network rather than the public Internet.

While some functionalities are generally described herein with reference to a particular implementation of the transactional database system, other components or a combination of components may additionally or alternatively implement such functionalities. Other variations of implementing the described functionality are known to those skilled in the art, and thus not described in more detail herein.

Figure 3:
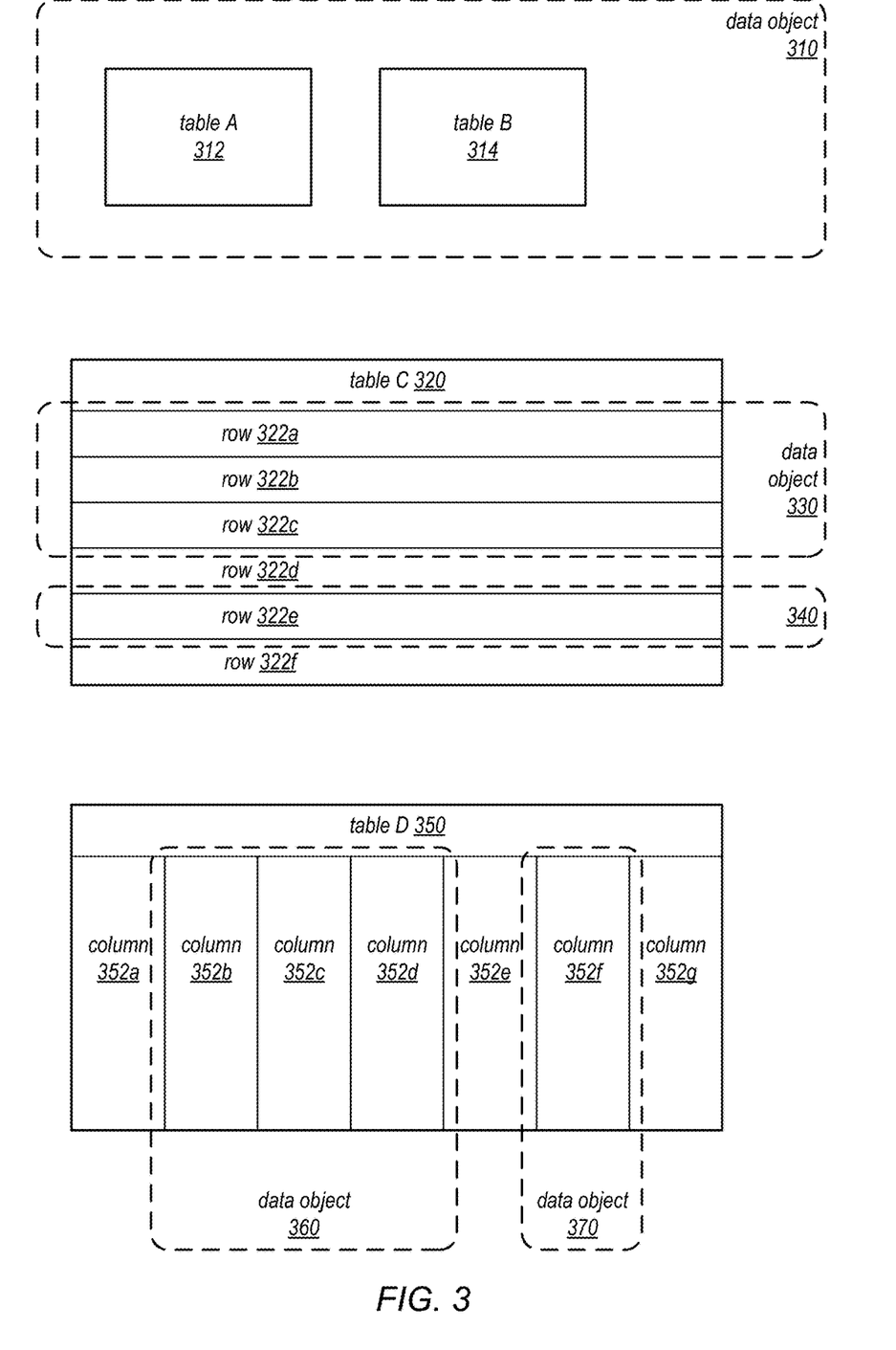
FIG. 3 illustrates different types of data objects that may be used by the transactional database system, according to some embodiments.

FIG. 3 illustrates different types of data objects that may be used by the transactional database system, according to some embodiments. The data objects 310, 330, 340, 360, and 370 illustrated in the figure are embodiments of data objects 154 discussed in connection with FIG. 1.

As shown, data object 310 comprises two tables, table A 312 and table B 314. Depending on the data layout of the database system, data object 310 may be a single data file or two data files in a common directory. By grouping multiple tables in the same data object 310, the transactional database system will treat the two tables as a single unit in terms of transaction isolation. For example, the two tables will share a committed state, so that a commit to either of the two tables will update the common committed state. This type of data object 310 may be useful for tables that are always updated together, such a parent-child table pair. As discussed, this arrangement may be specified by configuration. In some embodiments, by default, a data object will correspond to only one table.

As shown, data objects 330 and 340 correspond to different rows 322 of a table C 320. In some embodiments, the transactional database system may partition a table into multiple data files according to rows, where each data file is a row group, partition, or shard. The partitioning may be done based on partition key attribute(s) of the rows, depending on the table schema. As shown, data object 330 includes multiple rows 322a-c of the table, which may reside in a common data file or separate data files. Data object 340 includes just a single row 322e. Single row data objects may be useful in situations where the particular row is heavily accessed by many transactions.

As shown, data objects 360 and 370 correspond to different columns 352 of a table D 350. In some embodiments, the transactional database system may support columnar databases where the table is partitioned by column. Individual columns may correspond to individual data file(s). As shown, in this example, data object 360 includes multiple columns 352b-d, and data object includes just a single column 370. Each of these data objects may be a single committable unit in the transactional database system 100.

Figure 4:
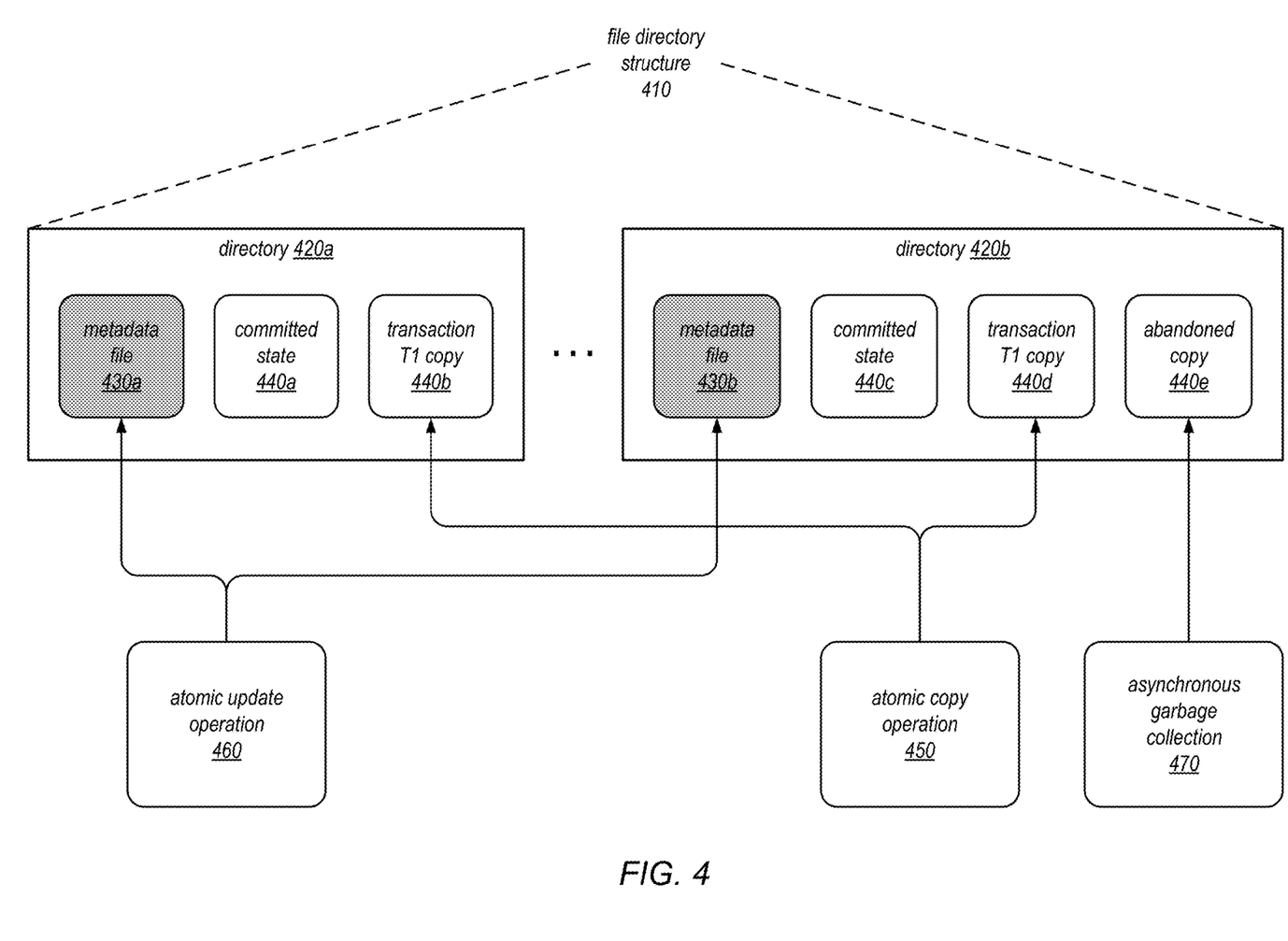
FIG. 4 illustrates an embodiment of the transactional database system that stores transactional metadata of data objects in individual file directories associated with the data objects, according to some embodiments.

FIG. 4 illustrates an embodiment of the transactional database system that stores transactional metadata of data objects in individual file directories associated with the data objects, according to some embodiments.

As shown in this example, the data objects 440a-e are stored as files in a file directory structure 410 implemented by the object storage system 140. Two directories 420a and 420b are shown. In this example, each directory 420 corresponds to a single data object, and stores a current committed state 440a and 440c of the data object as a file. In this example, the metadata files 430a and 430b, which are embodiments of the metadata objects 170 of FIG. 1, are stored in the same directory as their associated data object files. As discussed, these metadata files 430 act as pointers to refer to the file in the directory that represents the current committed state of the data object (here files 440a and 44c).

As shown, in this example, when a transaction T1 is initiated, copies 440b and 440d of the current committed state of the data objects are created in each directory. As discussed, these copies 440b and 440d may be private to transaction T1 and used for data reads and writes during execution of transaction T1.

As shown, in some embodiments, the creation of transaction copies 440b and 440d may be performed using an atomic copy operation 450. The atomic copy operation 450 may cause all copies for transaction T1 to be created in a single logical point in time, so that both copies 440b and 440d will reflect the same global commit point of the database. This strategy thus ensures that transactions on the database are globally serializable. To implement the atomic copy operation 450, the database system may maintain a database-level file that indicates whether any atomic copy operation is currently executing. If so, any other atomic copy operations will be queued or suspended until the currently execution copy operation is completed. In some embodiments, if an atomic copy operation is hung or fails unexpectedly, the database system will simply fail that transaction and allow other waiting copy operations to proceed. In some embodiments, to save time during the atomic copy operation, the database system may proactively make copies of certain data object files for use by transactions, so that the atomic copy operation does not actually need to perform the time-consuming copy step. The database system will take steps to ensure the proactive copies are consistent with the committed state of the data objects.

As shown, in some embodiments, the updating of the metadata file 430, which may be performed at both the initiation and completion of the transaction, is performed using an atomic update operation 460. The atomic update operation 460 ensures that all relevant metadata files 430 are performed in a single logical point in time, without intervening changes to the committed state of the database. The atomic update operation 460 may be implemented in much the same way as the atomic copy operation 450.

Finally, in some embodiments, the database system may implement an asynchronous garbage collection process 470 for remove any abandoned copies 440e left by failed transactions. As discussed, in some embodiments, the deletion of these copies 440e may not be performed as part of the transaction rollback process. Rather, the copies can be deleted by a later process such as the asynchronous garbage collection process 470. The garbage collection 470 may be performed as a periodic background process, or in some embodiments, during periods of low activity.

Figure 5:
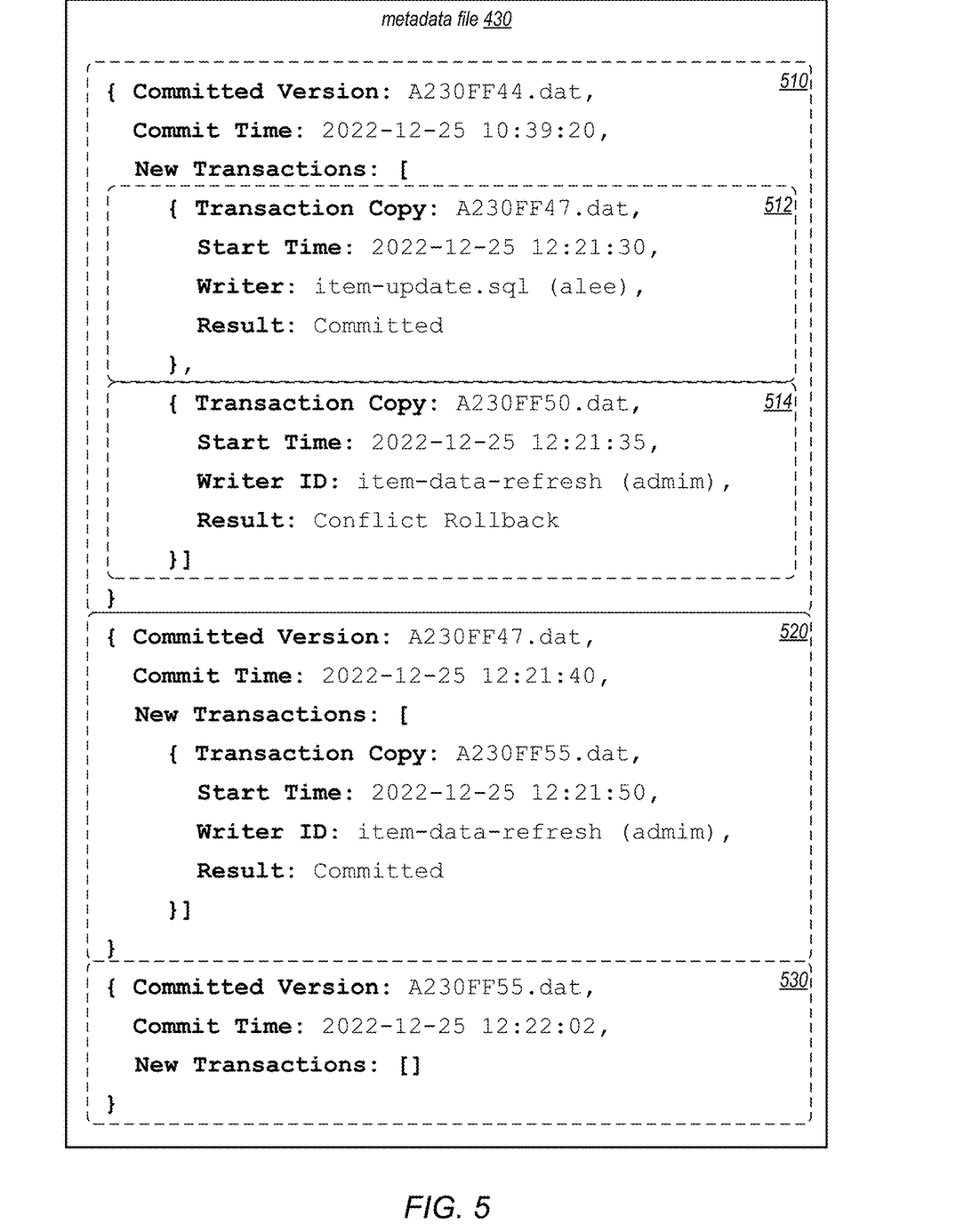
FIG. 5 illustrates an example metadata file used to store transactional metadata about one or more data objects, according to some embodiments.

FIG. 5 illustrates an example metadata file (e.g. metadata file 430) used to store transactional metadata about one or more data objects, according to some embodiments.

As shown, in this example, the metadata file 430 is stored in a human-readable text form. In some embodiments, the metadata file 430 may be formatted as a JSON data structure. In other embodiments, the metadata file 430 may be encoded in other data formats.

In some embodiments, metadata file 430 may be used to keep the history of transactions that have been committed on the data object. As seen in this example, each commit to the data object generates a commit record 510, 520, and 530 in the metadata file. Each commit record indicates the name of the data object file that represents the state of the data object after a commit, as well as the time of the commit. In this example, the last commit record 530 in the metadata file points to the current committed state of the object.

In some embodiments, individual commit records in the metadata file may also indicate any transactions that arose for the data object. For example, commit records 510 shows two competing transactions 512 and 514 that arose during the period for that committed version, including the private copy of the data object for each transaction, the start time of each transaction, the writer process associated with the transaction, and the result (e.g. committed or rolled back) of each transaction. As shown, committed state 510 was advanced to the next committed state 520 by the successful completion transaction 512. Losing transaction 514 was retried on committed state 520 to advance the data object to the next committed state 530.

The transaction data stored in the metadata file 430 may be used in a number of ways. As one example, this data may be displayed via a management interface to show which transactions are currently operating on which data objects in the database. As another example, the data may be used by transaction writers or the database system itself to take actions against potential conflicts among transactions, such as to proactively resolve a conflict. As yet another example, the historical data may be analyzed to identify historical conflict patterns and recommend measures to mitigate conflicts in the future. In some embodiments, the database system may implement a periodic archival process to archive obsolete versions of data objects in the object storage system, and the archival process may also archive the historical data in the metadata file.

Figure 6:
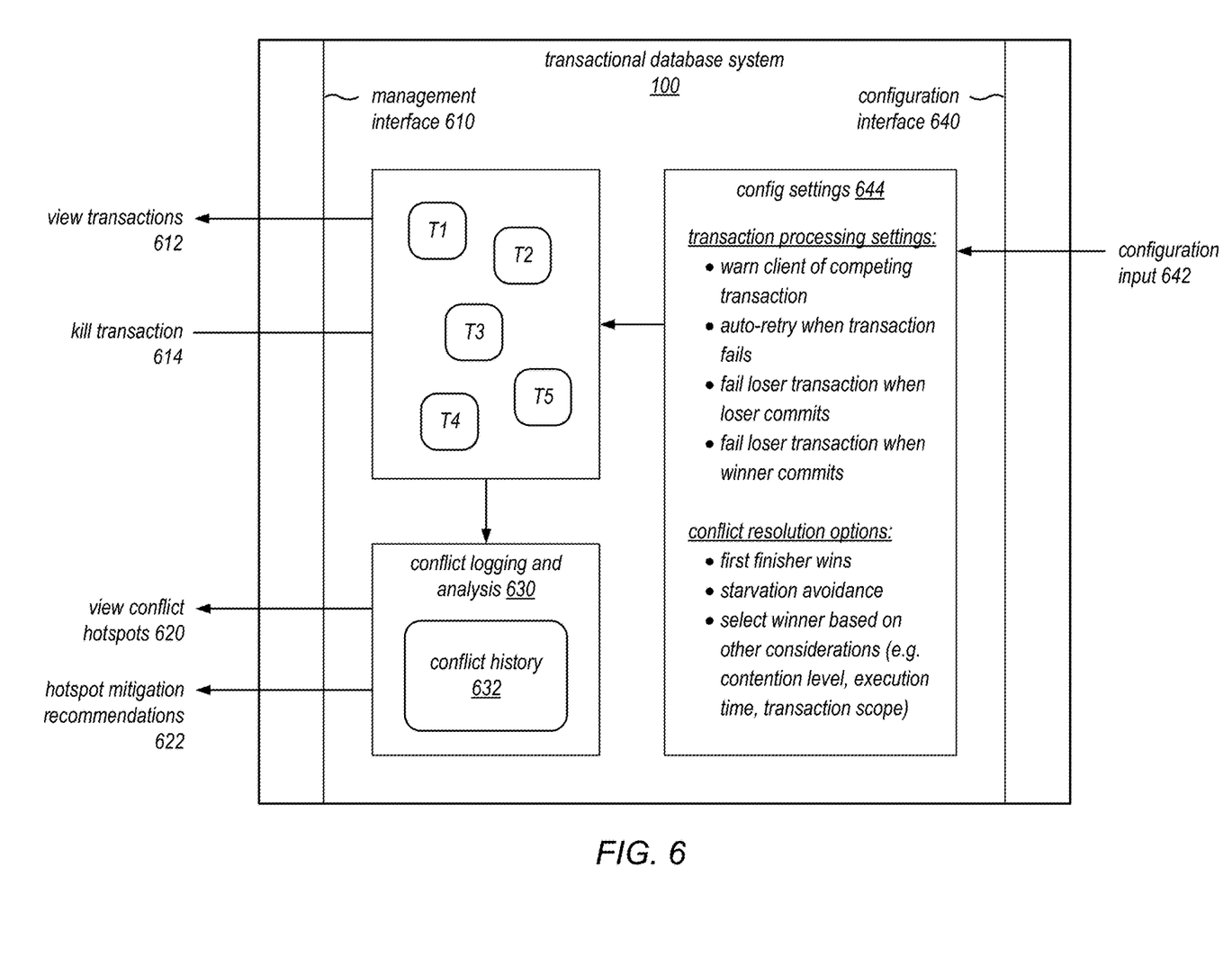
FIG. 6 illustrates example types of functionalities that may be exposed by a management interface and a configuration interface of the transactional database system, according to some embodiments.

FIG. 6 illustrates example types of functionalities that may be exposed by a management interface and a configuration interface of the transactional database system, according to some embodiments. The management interface 610 and configuration interface 640 shown in the figure may be programmatic interfaces (e.g. APIs) or user interactive interfaces (e.g. GUIs). In some embodiments, interfaces 610 and 640 may be implemented as web-based interfaces that are displayed by web browsers.

As shown, in some embodiments, the management interface 610 may be used (e.g. by a database system administrator) to view transactions 612 currently active in the database and kill 614 a running transaction in the database. In some embodiments, active transactions may be displayed with information such as the data objects that are part of the transaction scope and the running time of the transactions. In some embodiments, the displayed information may also indicate any potential conflicts among currently active transactions.

In some embodiments, the transactional database system may implement a conflict logging and analysis component 630, which will analyze conflict history 632 in the database (e.g. history data recorded in metadata file 430 of FIG. 3) to determine any conflict patterns or hotspots. A conflict hotspot may identify a particular transaction or group of transactions that is frequently causing conflicts in the database. Another type of conflict hotspot may identify one or more data objects that frequently cause conflicts. These detected conflict hotspots may be viewed 620 by database system administrators via the management interface.

Additionally, in some embodiments, the conflict analysis component 630 may generate hotspot mitigation recommendations 622 to administrators based on the conflict history data 632. For example, if two transactions are frequently observed to conflict with each other, the analysis component may recommend that one of the transactions be scheduled for a different time or broken up into smaller transactions to reduce its transaction scope. As another example, if a data object is frequently the cause of conflicts, the analysis component may recommend that the data object be partitioned. In some embodiments, the database system may automatically perform these actions on its own based on the conclusions of the analysis component.

As shown, the configuration interface 640 may be used to receive configuration input 642 to control the operations and transaction processing behavior of the transaction database system. The received configuration input 642 may be stored as configuration settings 644 in a configuration repository.

In some embodiments, the configuration settings may specify various aspects of how the system processes transactions. For example, in some embodiments, the database system may warn a database client when the system detects a competing transaction with the client's requested transaction. A competing transaction may be detected based on tracked transaction metadata (e.g. metadata file 430 of FIG. 5). The warning may be generated when a client first initiates a transaction, or when the competing transaction appears after initiation of the client transaction.

In some embodiments, the configuration settings may specify that if a transaction fails due to a rollback, it will automatically be retried for a certain number of times. In some embodiments, this retry behavior may be configured on a per-transaction basis.

In some embodiments, the configuration settings may specify when a loser transaction rollback will occur. Depending on the setting, the rollback may occur when the loser transaction attempts to commit its private copy, or immediately when the winner transaction succeeds in committing its copy. The former option may be preferable in some cases where the transaction writer wishes to receive rollback notifications synchronously to better handle the rollback.

In some embodiments, the configuration settings may also specify conflict resolution options. For example, in some cases, transaction resolution may default to a "first finisher wins" setting, where the first transaction that commits its private copy will cause all competing transactions to roll back. Another conflict resolution option may implement starvation avoidance. In one implementation, if a particular transaction has been retried after a number of rollbacks, the database system will allow that transaction to succeed by failing all transactions that compete with the starved transaction. As yet another example, embodiments of the database system proactively select winning transactions based on different factors such as current contention level of impacted data objects, the expected execution time of the transaction, the determined transaction scope of the transaction, etc. As will be appreciated by those skilled in the art, a wide variety of conflict resolution strategies are possible in different embodiments of the database system.

Figure 7:
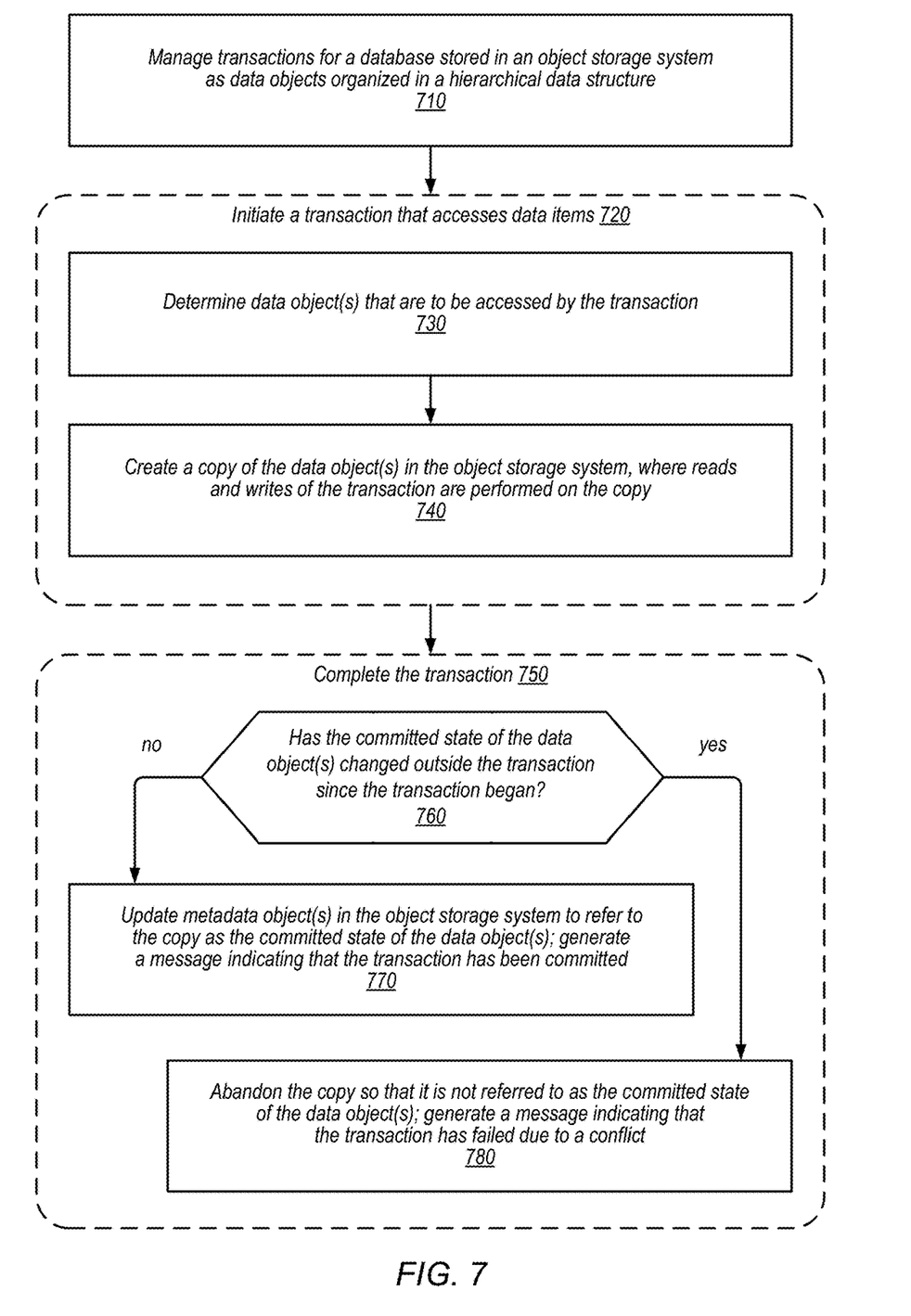
FIG. 7 illustrates an example process to execute a transaction in the transactional database system, according to some embodiments.

FIG. 7 illustrates an example process to execute a transaction in the transactional database system (e.g. transaction database system 100), according to some embodiments.

At operation 710, the transactional database system manages transactions for a database. Data in the database is stored in an object storage system (e.g. object storage system 140) as data objects (e.g. data objects 154) organized in a hierarchical data structure (e.g. hierarchical data structure 150. In some embodiments, the object storage system is a distinct system from the transactional database system, and may be operated remotely by a different operator (e.g. a multi-tenant infrastructure service provider). In some embodiments, the object storage system may be a distributed data storage system that provides strongly consistent writes. In some embodiments, the data objects 154 may be individual data files, and the hierarchical data structure may be a directory structure of a file system.

At operation 720, a transaction that accesses a plurality of data items (e.g. reads and writes multiple data times) is initiated. As discussed, the database system may perform the transaction atomically, where all data updates succeed or fail together, and all data reads and writes are performed in a single logical point in time. As shown, operations 730 and 740 are performed as part of the transaction initiation 720.

At operation 730, the database system determines data object(s) that will be accessed by the transaction. Operation 730 may be performed based on the code of the transaction based on the reads and writes in the transaction. In some embodiments, the transaction code may include a prepare statement or clause that explicitly specifies what data will be accessed by the transaction. In some embodiments, the transaction scope is determined based on a specified level of granularity or data object isolation, which may be specified for the database, the table(s), or the transaction.

At operation 740, a copy of the data object(s) that will be accessed by the transaction is created. The copy (e.g. copies 160 and 162) is created in the object storage system and possibly in the same location as the source data object(s). The copy will be used as a private copy by the transaction to read and write data during execution of the transaction. In some embodiments, the copy may be performed via an atomic copy operation (e.g. atomic copy operation 450).

At operation 750, the transaction is completed, either as a successful commit of the transaction or a rollback. Operations 760, 770, and 780 are all performed as part of the transaction completion 750.

At operation 760, a determination is made whether the committed state of the data object(s) accessed by the transaction has changed outside the transaction (e.g. by another committed transaction), since the transaction began. In some embodiments, this check is made based on the contents of one or more metadata objects (e.g. metadata file 430) or files stored in the object storage system. In some embodiments, the check may be made based on the native file metadata of the data object files.

If the committed state of the data object(s) has not changed, at operation 770, the database system updates the metadata object(s) in the object storage system to refer to the transaction's private copy as the newly committed state of the data object(s). Upon this update, the committed state of the data object(s) will be officially updated and made visible to all subsequent database readers. In some embodiments, the update of metadata objects may be performed as an atomic update operation (e.g. atomic update operation 460). After the committed state of the data object(s) has been updated, the database system generates a message (e.g. an acknowledgement to the client transaction request) indicating that the transaction has been successfully committed.

On the other hand, if the committed state of the data object(s) has not changed, at operation 780, the database system abandons the transaction's private copy so that it is not referred to as the committed state of the data object(s). In some embodiments, the abandonment may cause the private copy to be deleted or marked for later deletion. The database system may then generate a message to indicate that the transaction has failed (and rolled back) due to a conflict. In some embodiments, a rolled back transaction may be automatically retried by the database system for up to a certain number of attempts.

Figure 8:
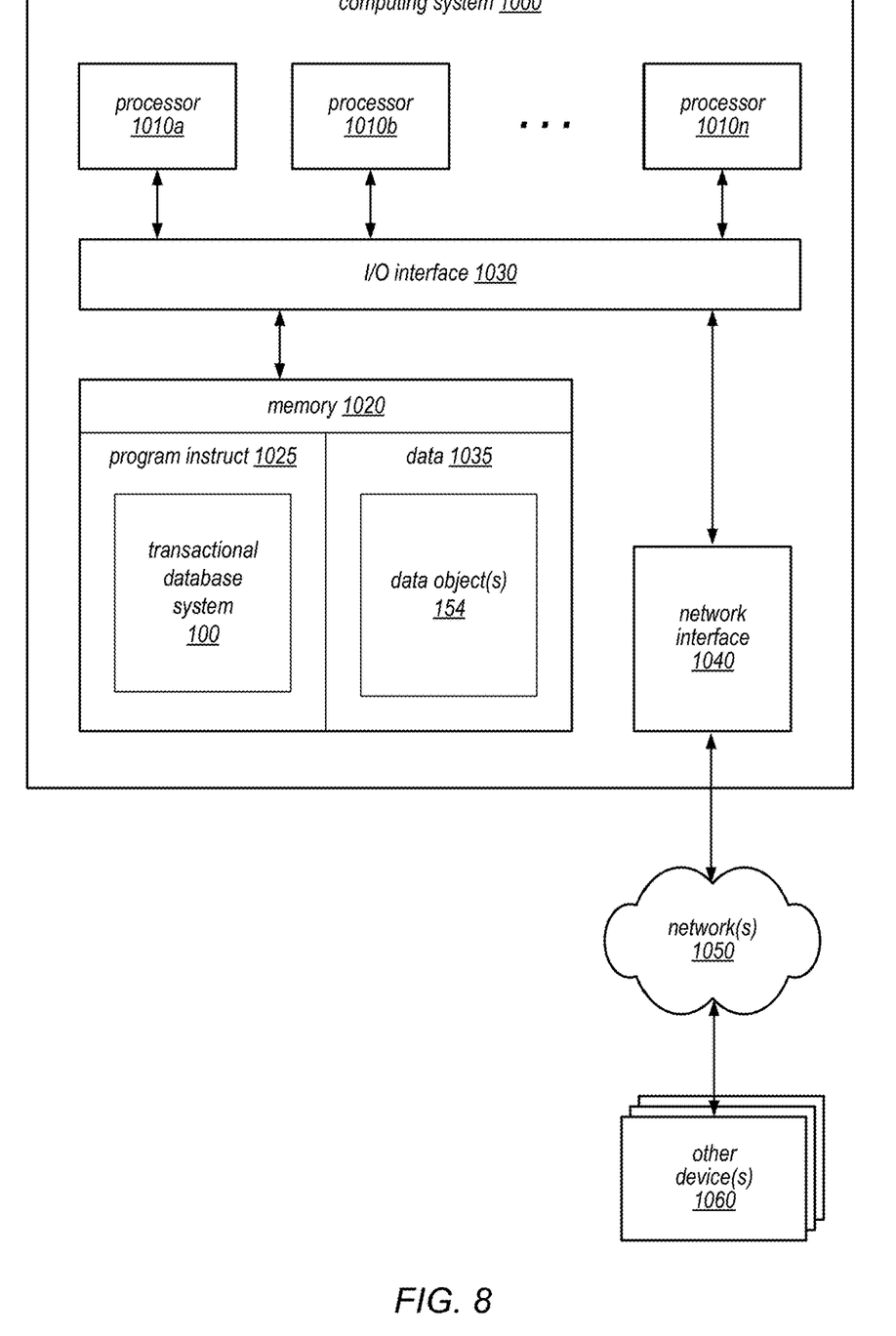
FIG. 8 is a block diagram illustrating an example computer system that can be used to implement one or more portions of the transactional database system, according to some embodiments.

FIG. 8 is a block diagram illustrating an example computer system that can be used to implement one or more portions of the transactional database system, according to some embodiments.

Computer system 1000 may include or be configured to access one or more nonvolatile computer-accessible media. In the illustrated embodiment, computer system 1000 includes one or more processors 1010 coupled to a system memory 1020 via an input/output (I/O) interface 1030. Computer system 1000 further includes a network interface 1040 coupled to I/O interface 1030.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

System memory 1020 may be configured to store instructions and data accessible by processor(s) 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 1020 as code 1025 and data 1035. As shown, in some embodiments, the program instructions memory 1025 may be used to implement one or more executable components such as the transactional database system 100 of FIG. 1. As shown, in some embodiments, the data memory 1035 may be used to store data such as the data object(s) 154 of FIG. 1.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices 1060 attached to a network or networks 1050, such as other computer systems or devices, such as routers and other computing devices, as illustrated in FIGS. 1 through 8, for example. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks such as Fibre Channel SANs, or via any other suitable type of network and/or protocol.

In some embodiments, system memory 1020 may be one embodiment of a computer-accessible medium configured to store program instructions and data as described above for FIGS. 1 through 8 for implementing embodiments of methods and apparatus for traffic analysis. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1000 via I/O interface 1030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system, comprising:
   one or more processors with associated memory that implement a transactional database system, configured to:
   manage transactions for a database, wherein the database is stored in a file system as plurality of data objects, wherein individual data objects are files that store table data associated with respective tables of the database, and individual tables of the database are stored under respective table directories in the file system;
   initiate a transaction that accesses a plurality of data items in the database, including to:
   determine one or more of the data objects that are to be accessed by the transaction; and
   create a copy of the one or more data objects in the file system, wherein updates in the transaction are performed on the copy; and
   commit the transaction, including to:
   verify that a committed state of the one or more data objects has not changed since the initiation of the transaction;
   update one or more metadata objects in the file system to refer to the copy as the committed state of the one or more data objects; and
   generate a message indicating that the transaction has been committed.

2. The system of claim 1, wherein the transactional database system is configured to:
   initiate a second transaction on the database;
   create a copy of a data object in the file system for use by the second transaction;
   determine that a committed state of the data object has changed since the initiation of the second transaction;
   abandon the copy of the data object so that the copy is not referred to as the committed state of the data object; and
   generate a message indicating that the second transaction has failed.

3. A system of claim 1, wherein the file system is a distributed file system that provides strong consistency for committed write requests.

4. A system of claim 1, wherein the transactional database system is configured to manage a second database that stores data in an object storage service provided by a multi-tenant infrastructure service provider network.

5. A system of claim 1, wherein the transactional database system is configured to automatically retry a particular transaction when the particular transaction fails to commit due to a conflict.

6. A system of claim 1, wherein an individual data object in the transactional database system corresponds to a portion of a table, the portion including one or more rows in the table or one or more columns in the table.

7. A system of claim 1, wherein the transactional database system is configured to store metadata objects for each data object in a same directory as the data object.

8. A system of claim 7, wherein to commit the transaction, the transactional database system is configured to modify multiple metadata objects in atomic fashion.

9. A system of claim 1, wherein a metadata object indicates multiple uncommitted transactions on a data object over a baseline version of the data object, and the metadata object is used to verify that the baseline version represents a currently committed state of the data object.

10. A system of claim 9, wherein a metadata object records a sequence of versions of the data object, including timestamps and writer IDs associated with the versions.

11. A method, comprising:
    performing, by a transactional database system implemented by one or more processors with associated memory:
    managing transactions for a database, wherein the database is stored in a file system as plurality of data objects, wherein individual data objects are files that store table data associated with respective tables of the database, and individual tables of the database are stored under respective table directories in the file system;
    initiating a transaction that accesses a plurality of data items in the database, including:
    determining one or more of the data objects that are to be accessed by the transaction; and
    creating a copy of the one or more data objects in the file system, wherein updates in the transaction are performed on the copy; and
    committing the transaction, including:
    verifying that a committed state of the one or more data objects has not changed since the initiation of the transaction;
    updating one or more metadata objects in the file system to refer to the copy as the committed state of the one or more data objects; and
    generating a message indicating that the transaction has been committed.

12. The method of claim 11, further comprising the transactional database system:
    initiating a second transaction on the database;
    creating a copy of a data object in the file system for use by the second transaction;
    determining that a committed state of the data object has changed since the initiation of the second transaction;

abandoning the copy of the data object so that the copy is not referred to as the committed state of the data object; and generating a message indicating that the second transaction has failed.

13. A method of claim 11, wherein the file system is a distributed file system that provides strong consistency for committed write requests.

14. A method of claim 11, wherein an individual data object in the transactional database system corresponds to a portion a table, the portion including one or more rows in the table or one or more columns in the table.

15. A method of claim 11, further comprising the transactional database system storing metadata objects for each data object in a same directory as the data object.

16. A method of claim 11, further comprising the transactional database system:

detecting that two uncommitted transactions are pending on a same data object; and generating a message indicating a potential conflict to at least one database client associated with at least one of the two uncommitted transactions.

17. A method of claim 11, further comprising the transactional database system:

detecting that two uncommitted transactions are pending on a same data object; and causing a first of the two uncommitted transactions to fail and allowing a second of the two uncommitted transactions to proceed.

18. A method of claim 17, further comprising the transactional database system:

selecting the second uncommitted transaction to proceed based on a number of previous failed attempts of the second uncommitted transaction.

19. One or more non-transitory computer-accessible storage media storing program instructions that when executed on one or more processors of transactional database system cause the transactional database system to:

manage transactions for a database, wherein the database is stored in a file system as plurality of data objects, wherein individual data objects are files that store table data associated with respective tables of the database, and individual tables of the database are stored under respective table directories in the file system;

initiate a transaction that accesses a plurality of data items in the database, including to:

determine one or more of the data objects that are to be accessed by the transaction; and create a copy of the one or more data objects in the file system, wherein updates in the transaction are performed on the copy; and commit the transaction, including to:

verify that a committed state of the one or more data objects has not changed since the initiation of the transaction;

update one or more metadata objects in the file system to refer to the copy as the committed state of the one or more data objects; and generate a message indicating that the transaction has been committed.

20. The non-transitory computer-accessible storage media of claim 19, wherein the program instructions when executed on the one or more processors cause the transactional database system to:

initiate a second transaction on the database;

create a copy of a data object in the file system for use by the second transaction;

determine that a committed state of the data object has changed since the initiation of the second transaction;

abandon the copy of the data object so that the copy is not referred to as the committed state of the data object; and generate a message indicating that the second transaction has failed.

* * * * *